United States Patent
Thiessen

(10) Patent No.: US 9,828,787 B1
(45) Date of Patent: Nov. 28, 2017

(54) COVERING TENT FOR SURROUNDING A WIND TURBINE AT ITS BASE DURING A GROUTING OPERATION

(71) Applicant: Winkler Canvas Ltd., Winkler (CA)

(72) Inventor: Calvin Thiessen, Winkler (CA)

(73) Assignee: Winkler Canvas Ltd., Winkler MB (CA)

( * ) Notice: Subject to any disclaimer, the term of this patent is extended or adjusted under 35 U.S.C. 154(b) by 0 days.

(21) Appl. No.: 15/286,271

(22) Filed: Oct. 5, 2016

(51) Int. Cl.
| | | |
|---|---|---|
| E04H 15/02 | (2006.01) |
| E04G 21/32 | (2006.01) |
| E04H 15/18 | (2006.01) |
| E04H 15/64 | (2006.01) |
| E02D 31/00 | (2006.01) |
| E02D 27/42 | (2006.01) |
| F03D 13/20 | (2016.01) |

(52) U.S. Cl.
CPC ............ *E04H 15/02* (2013.01); *E02D 31/00* (2013.01); *E04G 21/32* (2013.01); *E04H 15/18* (2013.01); *E04H 15/64* (2013.01); *E02D 27/425* (2013.01); *F03D 13/20* (2016.05); *Y10S 52/12* (2013.01); *Y10S 52/14* (2013.01); *Y10S 135/90* (2013.01); *Y10S 135/905* (2013.01)

(58) Field of Classification Search
CPC ......... E04H 15/02; E04H 15/04; E04H 15/18; E04H 15/26; E04H 15/28; E04H 15/64; Y10S 135/90; Y10S 135/905
USPC ................. 135/90, 96, 97, 98, 99, 900, 905; 52/DIG. 12, 14
See application file for complete search history.

(56) References Cited

U.S. PATENT DOCUMENTS

| | | | | | |
|---|---|---|---|---|---|
| 699,513 | A | * | 5/1902 | Garms | A41D 13/04 135/115 |
| 3,004,542 | A | * | 10/1961 | Moody | E04B 1/34326 135/100 |
| 3,783,906 | A | * | 1/1974 | Matherne | F16L 13/02 135/900 |
| 3,945,106 | A | * | 3/1976 | Mayr | E04H 5/12 135/90 |
| 4,180,867 | A | * | 1/1980 | Ridgeway, Jr. | A41D 15/04 135/96 |

(Continued)

FOREIGN PATENT DOCUMENTS

JP        06322995 A * 11/1994
JP        07247095 A *  9/1995

*Primary Examiner* — Robert Canfield
(74) *Attorney, Agent, or Firm* — Adrian D. Battison; Ade & Company Inc.

(57) ABSTRACT

A tent for surrounding a base of an upstanding structure on a support surface is disclosed. The tent features a covering with a top edge arranged to follow a perimeter of the structure base and a bottom edge arranged to define an outer periphery of the covering. The tent additionally features a base strap arranged for forming a closed loop about the structure base at a predetermined height above the support surface. The base strap supports a first attachment member, and a second attachment member is located along the top edge of the covering for cooperating with the first attachment member to fasten the covering at the structure base. A tightening strap along the top edge of the covering but behind the second attachment member is arranged to follow the base strap to seal connection of the covering and the base strap.

18 Claims, 4 Drawing Sheets

(56) References Cited

U.S. PATENT DOCUMENTS

| | | | | | |
|---|---|---|---|---|---|
| 4,883,512 | A | * | 11/1989 | Griffis | B01D 46/00 135/121 |
| 4,922,942 | A | * | 5/1990 | Schaeffer | E04H 15/04 135/90 |
| 6,178,979 | B1 | * | 1/2001 | Galloway | A47B 37/04 108/50.12 |
| 6,202,354 | B1 | * | 3/2001 | Kirby | A63B 71/0054 52/4 |
| 7,246,468 | B2 | * | 7/2007 | Forbis, Sr. | B65D 90/00 135/96 |
| 2012/0012142 | A1 | * | 1/2012 | Frady | E04H 15/001 135/90 |
| 2013/0186443 | A1 | * | 7/2013 | Jeziorski | A01M 31/025 135/90 |
| 2014/0150835 | A1 | * | 6/2014 | Heilman | A01M 31/025 135/90 |
| 2016/0010354 | A1 | * | 1/2016 | Gaudet, III | B60P 7/0876 52/745.06 |
| 2016/0143264 | A1 | * | 5/2016 | Blaha | A01M 31/025 135/96 |

\* cited by examiner

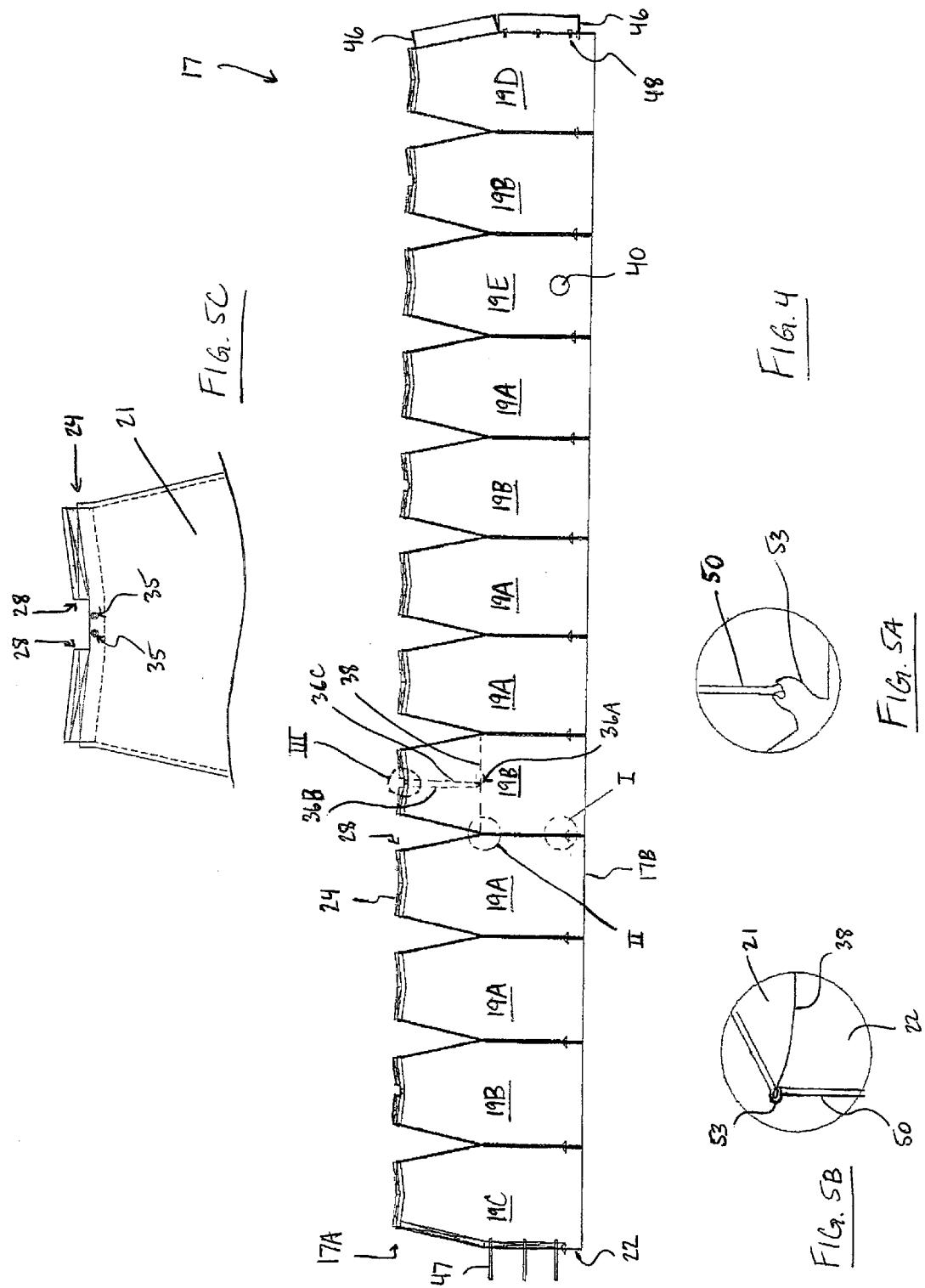

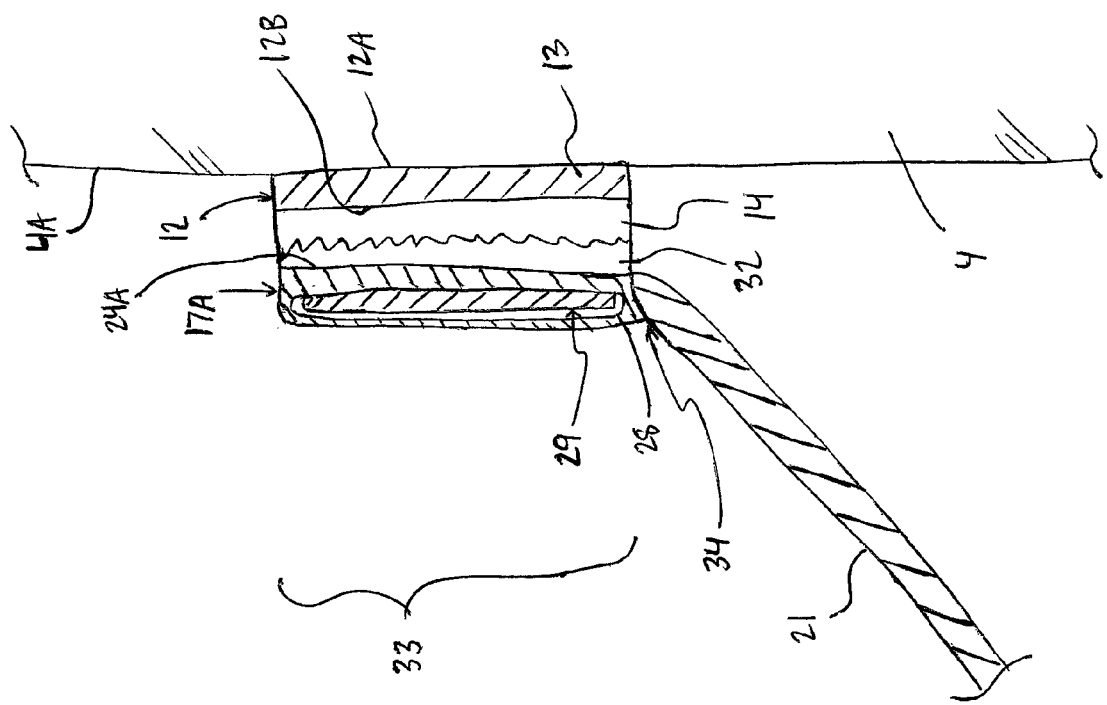

COVERING TENT FOR SURROUNDING A WIND TURBINE AT ITS BASE DURING A GROUTING OPERATION

FIELD OF THE INVENTION

The present invention relates to tents and tent-like covering structures which are attachable to an upstanding structure supported in fixed location on a support surface so as to form a sheltered space about a periphery of the upstanding structure. The present invention is particularly suited for attachment to a base of a wind turbine tower but may also be used with other upstanding structures such as a conventional residential or commercial building.

BACKGROUND

Generally speaking, a wind turbine comprises a foundation mounted fixedly in a support surface such as the ground or a bottom of a body of water; a shaft or tower arranged for mounting on the foundation in upstanding condition; and a plurality of blades forming a rotor at a top of the tower with a generator operatively coupled thereto so that rotation of the rotor can generate electric power.

As part of installation of the wind turbine, grouting is performed at its base to securely connect the tower to the foundation. This is a key operation which requires proper conditions be maintained during application and curing of the grout, including appropriate temperature and moisture level. More specifically, a dry, warm environment is preferred for grouting.

The applicant has developed a unique solution which is particularly suited for sheltering a space around a base of the tower, where it meets the foundation, in order to provide suitable conditions for a grouting operation.

SUMMARY OF THE INVENTION

According to one aspect of the invention there is provided a tent for surrounding a base of an upstanding structure in fixed location on a support surface that has a polygonal-shaped perimeter comprising:

a covering having a top edge arranged to follow the perimeter of the structure base at a predetermined height above the support surface and a bottom edge arranged to define an outer periphery of the covering in an installed condition surrounding the structure base;

an attachment arrangement for attaching the covering to the structure at its base including a base strap arranged for wrapping about the perimeter of the structure base at the predetermined height above the support surface;

the base strap having an outer face with a first attachment member;

the attachment arrangement including a second attachment member along the top edge of the covering that is cooperative with the first attachment member so as to fasten the top edge to the base strap in a manner following the perimeter of the structure base;

the covering being arranged in the installed condition for forming a sheltered space around the base of the structure between the top edge of the covering which is attached to the base strap around the perimeter of the base and the outer periphery of the covering.

In one arrangement the upstanding structure is a wind turbine where the sheltered space is formed at the base of a wind turbine tower.

Typically the covering is made of canvas material.

Preferably the covering is formed in a plurality of sections each arranged to span a portion of the perimeter of the structure base and each comprising a roof portion forming at one end thereof a portion of the top edge of the covering and a wall portion forming at one end thereof which is distal to the roof portion a portion of the bottom edge of the covering, wherein the sections are connected together at their sides in a prefabricated fashion so that the covering is arranged for wrapping about the base structure.

As such, during installation of the tent one free side of the covering at a distal one of the sections is displaced about the perimeter of the structure base until this side meets a free side at an opposite distal one of the sections so as to form a contiguous barrier around the structure base.

Typically the sections are connected together at their wall portions in the prefabricated fashion so that the roof portions of each pair of adjacent sections are connectable during installation at a seam formed therebetween.

Typically the sides of each section at the wall portion are parallel to one another and the roof portion is tapered from its bottom proximal the wall portion to said end forming the portion of the top edge.

For example the wall portion is generally rectangular in shape and the roof portion is generally trapezoidal in shape.

In one arrangement the first and second attachment members comprise cooperating portions of VELCRO hook and loop type fasteners.

Preferably the base strap is arranged to form a closed loop having an adjustable circumference such that the base strap is arranged for tightening about the base structure once wrapped thereabout.

Preferably there is provided along the top edge of the covering a tightening strap behind the second attachment member such that the second attachment member is disposed intermediate the tightening strap and the base strap in the installed condition with the tightening strap being arranged to form a closed loop following the base strap to seal connection of the first and second attachment members in the installed condition.

As such, the tightening strap acts to sandwich the first and second attachment members about the perimeter of the structure between the tightening strap and the base strap whereby a sealing effect of the covering at the base strap is provided.

Preferably the covering comprises a body of material extending from the top edge of the covering towards the bottom edge that is translucent so as to allow passage of light externally of the sheltered space through the body of material.

That is, at least the roof portions of the covering sections comprise the translucent material.

In one arrangement there is provided at least one opening in the covering with a conduit extending therefrom for guiding conditioned air generated by a conditioning source through said opening into or out of the sheltered space of the installed condition.

Typically this conditioning source is a heater arranged to generate a heated air flow for heating the sheltered space.

Preferably the covering has opposite sides arranged for removably joining together in a manner forming an entry to the sheltered space with one of the sides including flaps for overlapping the other side of the covering to seal the entry when it is closed.

The covering may include pleats each extending from the top edge towards the bottom edge where the pleats are arranged at locations spaced uniformly each from the next so as to be arranged in the installed condition at positions uniformly spaced about the perimeter of the structure.

Thus, a single size covering may be manufactured to fit a range of sizes of structure perimeter with the pleats being formed to adjust the length of the top edge to match a selected perimeter within the range.

Preferably, when the covering is in the installed condition, the bottom edge of the covering is arranged at the support surface such that the sheltered space around the structure base is enclosed from the predetermined height at the base to the support surface.

According to another aspect of the invention there is provided a method for arranging a sheltered space around a base of an upstanding structure resting on a support surface that has a polygonal-shaped perimeter comprising:

providing a tent for forming the sheltered space comprising:
  a covering having a top edge arranged to follow the perimeter of the structure base at a predetermined height above the support surface and a bottom edge arranged to define an outer periphery of the covering in an installed condition surrounding the structure base;
  an attachment arrangement for attaching the covering to the structure at its base including a base strap arranged for wrapping about the perimeter of the structure base at the predetermined height above the support surface;
  the base strap having an outer face with a first attachment member;
  the attachment arrangement including a second attachment member along the top edge of the covering that is cooperative with the first, attachment member so as to fasten the top edge to the base strap in a manner following the perimeter of the structure base;
attaching the base strap to the structure at the predetermined height with an inner face of the base strap facing towards the structure so that the base strap forms a closed loop about the structure;
attaching the top edge of the covering by the second attachment member to the base strap at its first attachment member so as to wrap the top edge about the perimeter of the base of the structure thereby locating said top edge at the structure;
arranging the bottom edge of the covering at a location spaced outwardly from the structure so as to define the outer periphery of the covering;
whereby the sheltered space is formed around the base between the top edge of the covering which is attached to the base strap around the perimeter of the base and the outer periphery of the covering.

Preferably the covering is formed in a plurality of sections each arranged to span a portion of the perimeter of the structure base and each comprising a roof portion forming at one end thereof a portion of the top edge of the covering and a wall portion forming at one end thereof which is distal to the roof portion a portion of the bottom edge of the covering, wherein the sections are connected together at their sides in a prefabricated fashion so that the covering is arranged for wrapping about the base structure, and wherein the step of attaching the top edge of the covering to the base strap includes wrapping the plurality of sections unitarily forming the covering about the base of the structure.

Preferably there is provided a tightening strap along the top edge of the covering at a position outwardly of the second attachment member that is arranged to form a closed loop following the base strap, and, with the top edge of the covering attached to the base strap, there is provided a step of pressing the top edge in its attached state to the base strap by adjusting a circumference of the closed loop of the tightening strap so as to seal a junction of the covering at its top edge and the base strap.

Preferably the base strap is arranged to have an adjustable circumference when formed in the loop, and the step of attaching the base strap to the base of the structure includes adjusting said circumference of the loop to tighten the base strap around the perimeter of the structure.

In one arrangement the upstanding structure is an electric wind turbine where the sheltered space is formed about the base of a tower of the turbine.

BRIEF DESCRIPTION OF THE DRAWINGS

One embodiment of the invention will now be described in conjunction with the accompanying drawings in which:

FIG. 4 illustrates a covering of the tent of FIG. 1 in a pre-installation state showing all sections of the covering and where some components are omitted for clarity of illustration.

FIGS. 5A and B are enlarged partial views of the covering respectively indicated at I and II in FIG. 4 showing loops of the covering for receiving a frame of the tent. More specifically, FIG. 5A shows a lower one of the loops, and FIG. 5B shows an upper one of the loops where the covering is illustrated in installed condition.

FIG. 5C is an enlarged partial view indicated at III in FIG. 4.

FIG. 6 is a schematic illustration of a top of the tent where it meets the tower of the wind turbine in installed condition.

In the drawings like characters of reference indicate corresponding parts in the different figures.

DETAILED DESCRIPTION

Figure 1:
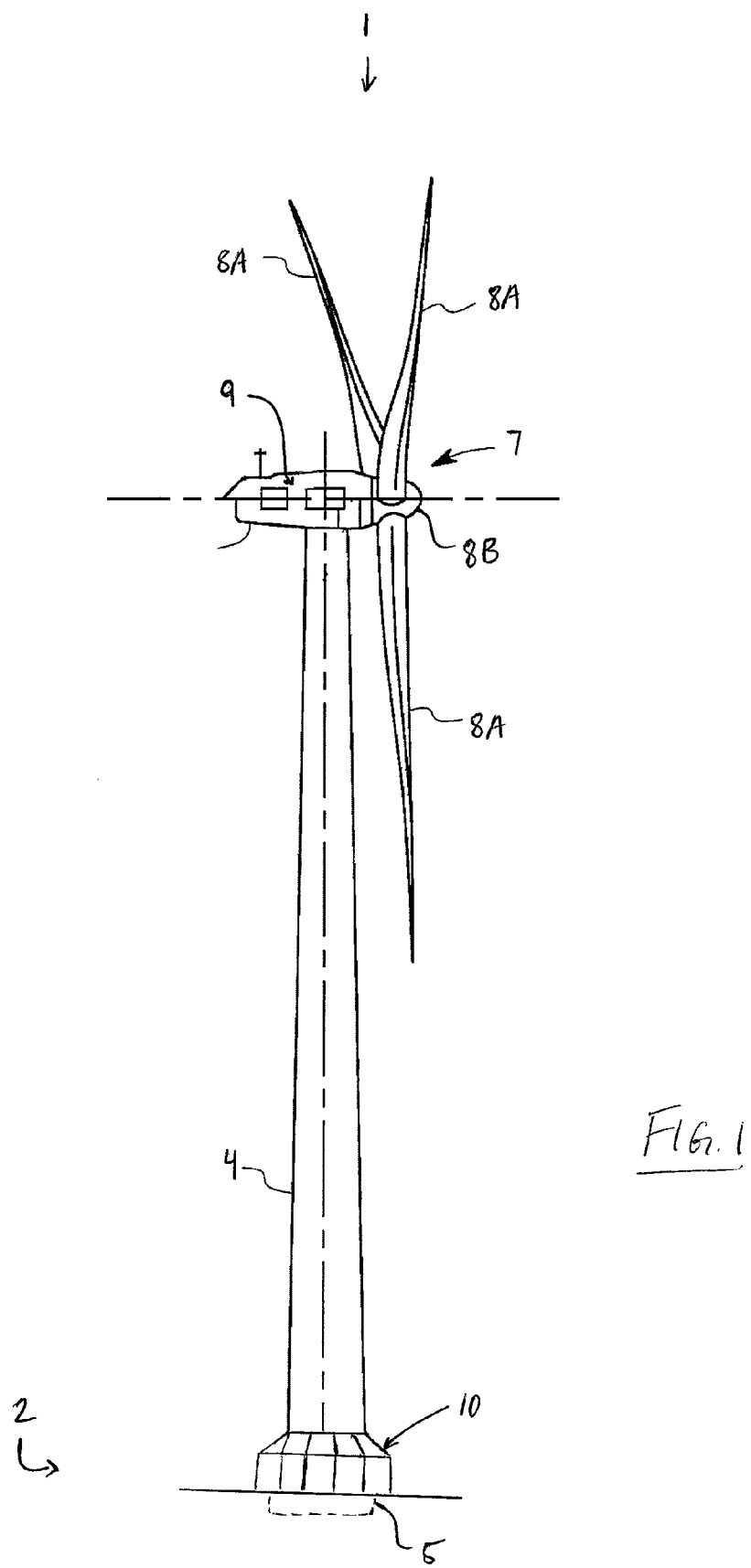
FIG. 1 is an elevational view of wind turbine and tent according to the present invention in installed condition around a base of a tower of the wind turbine where some components are omitted for clarity of illustration.

The accompanying figures illustrate a tent generally indicated at 10 which is designed for use particularly but not exclusively with a conventional wind turbine 1 at its base 2. The tent 10 is installed around an entirety of a perimeter of the base of the turbine so as to form an enclosed sheltered space SS thereabout during construction of the wind turbine. More specifically, the tent is installed during a grouting operation where grout is applied in a space of the connection between an upstanding tower 4 of the wind turbine and its foundation 5 (schematically shown) which is mounted in the ground. Appropriate conditions including temperature and moisture level must be maintained for proper application and curing of the grout during this operation. In addition to the tower 4 and foundation 5, the wind turbine comprises a rotor 7 at an upper end of the tower with blades 8A extending radially outwardly of a central hub 8B. The hub 8B is in turn operatively connected for example by a shaft (not shown) to an electric generator 9 (schematically shown) for generating electricity as in a conventional wind turbine.

In short and generally speaking, the tent 10 is particularly suited to surround the wind turbine tower at the base 2 and form thereabout an enclosed sheltered space providing suitable conditions for the grouting operation.

In the illustrated arrangement the tower 4 is shown as having a circular cross-section such that a perimeter at the base is circular, which is common. However, in other arrangements the tower may have a different polygonal-shaped perimeter, for example rectangular (including square) and hexagonal, and thus the tent of the present invention is not limited for use only with towers with circular perimeters.

The tent includes a kit of components which allow for the tent to form the sheltered space in the installed condition.

Thus, there is provided a base strap 12 which acts as a base for attaching the tent at the tower. The base strap 12 comprises an elongate strip of fabric material 13 supporting on one face thereof Velcro fastening material 14 which is for example sewn at that face of the fabric strip. At one end of the strip the base strap 12 carries a conventional ratchet 15 (schematically shown), similar to what is found in a ratchet tie-down strap, through which an opposite end of the strap may be fed in order to form a closed loop about the perimeter of the base 2. That is, the base strap 12 may be wrapped about the perimeter of the tower's base.

The base strap wrapped about the perimeter of the base 2 is arranged at a predetermined height H above the ground or support surface as it locates a top edge 17A of a covering 17 of the tent, as will be better appreciated shortly. The predetermined height H is typically sufficiently high above the ground or the support surface so that a person of average height may comfortably work within the sheltered space formed by the tent in its installed condition surrounding the base 2.

By means of the ratchet 15 in the illustrated arrangement the loop formed by the base strap 12 has an adjustable circumference which is arranged to substantially correspond to the perimeter of the tower 4 at its base. This helps to seal the tent 10 at the tower so that foreign contents, for example debris and moisture, are inhibited from passing into the sheltered space between the base strap and the tower from outside same. Thus, the base strap is tightened around the perimeter of the base as best possible.

The covering 17 defines a body of material which is attached at one end, that is its top edge 17A, to the base strap 12 and an opposite end, that is its bottom edge 17B, is arranged at or adjacent the support surface (in this instance the ground) outwardly from the tower so as to define the sheltered space of the tent. The covering is formed in a plurality of sections, specifically twelve sections in the illustrated arrangement, which are indicated at 19A-19E each designating a specific section type. Each section which is made of a canvas material is arranged to span a portion of the perimeter of the tower base.

Each covering section 19A-19E includes a roof portion 21 which is generally trapezoidal in shape and a wall portion 22 which is generally rectangular in shape. The roof portion 21 forms at one free end a portion of the top edge 17A of the covering, while the wall portion at its end distal to the roof portion forms a portion of the bottom edge 17B of the covering. The canvas material is translucent so that external (natural) light is allowed to pass through the fabric at both the roof portion and the wall portion to better illuminate the sheltered space. In some arrangements, only the roof portion may be made of the translucent canvas material to allow passage of light externally of the sheltered space through the material of the covering. For example, the canvas material of the covering 17 is 12 oz. white fire retardant polyolefin with 80% light transparency.

The sections 19A-19E are connected together at their sides in a prefabricated fashion so that the covering is arranged for wrapping about the base and thus the covering may define a single body of material. As such, during installation of the tent one free side of the covering at a distal one of the sections is displaced about the perimeter of the structure base until this side meets a free side at an opposite distal one of the sections so as to form a contiguous barrier around the tower base. More particularly, the sections are joined at their wall portions 22 so that the roof portions 21 of each adjacent pair of sections are connected upon installation at the wind turbine. Thus, while each adjacent pair of sections may be sewn together at their wall portions, so as to be connected in a substantially permanent fashion, the sides of the respective section at the roof portion thereof are removably joinable for example by cooperating push-pin clips at spaced positions along the roof portion sides. That is, in this example one set of male-style clips are disposed on an underside of the roof portion and another set of female-style clips are disposed on the topside of the roof portion of the adjacent section and adjacent sides of adjacent roof portions are overlapped to facilitate the push-pin clip connection therebetween. A ridge (not shown) may be formed on that roof portion which is positioned on the underside of the overlapping connection, extending from a top end 24 of the respective section towards a bottom end at a location spaced inwardly from a side edge of the roof portion of that section. This ridge is raised to a height of a side edge of the roof portion positioned overtop in the overlapping connection such that rain or debris is inhibited from passing between the sides of adjacent roof portions which are overlapped.

Furthermore, as the sections 19A-19E are prefabricated to be joined at their wall portions 22 the sections define a continuous and uninterrupted bottom edge 17B of the covering. The covering top edge 17A is defined collectively by the top ends 24 of the sections so that in the installed condition a contiguous top edge is formed.

Each section includes a pocket 28 at the top end 24 thereof with openings at its sides so that a tightening strap 29 may be fed through all of the sections 19A-19E in a manner following the top edge 17A of the covering. The tightening strap 29 includes an elongate strip of fabric material 30 with a conventional ratchet 31 (like that of a ratchet tie-down strap) received at one terminus of the strip so that an opposite terminus of the strip of fabric may be passed therethrough for forming a closed loop and adjusting a circumference of that loop, thereby tightening the strap 29.

As best shown in FIG. 6, an inner face 24A at the top end 24 where the pocket 28 is located and which is arranged to face towards the base strap 12 and the tower 4 supports a Velcro fastening material 32 which is cooperative with the Velcro fastening material 14 of the base strap 12. Thus, the covering's top edge 17A is arranged to follow the perimeter of the base 2 at the predetermined height H by attaching to the base strap 12 arranged thereat. As such, the Velcro fastening material 14 on the base strap defines a first attachment member and the Velcro fastening material 32 on the top edge 17A of the covering defines a second attachment member. Furthermore, both attachment members 14, 32 with base strap 12 collectively define an attachment arrangement 33 for attaching the covering 17 to the structure 1 at its base 2.

The pocket 28 may be formed by a strip of canvas material extending across the section that is folded over on itself along its length to form a cavity and sewn at 34 along the top end 24 of the roof portion, Many of the sections 19A-19E are substantially the same in shape. In the illustrated arrangement there are provided some differences between the sections which are described in more detail below which may be most clearly shown in FIG. 4.

Figure 3:
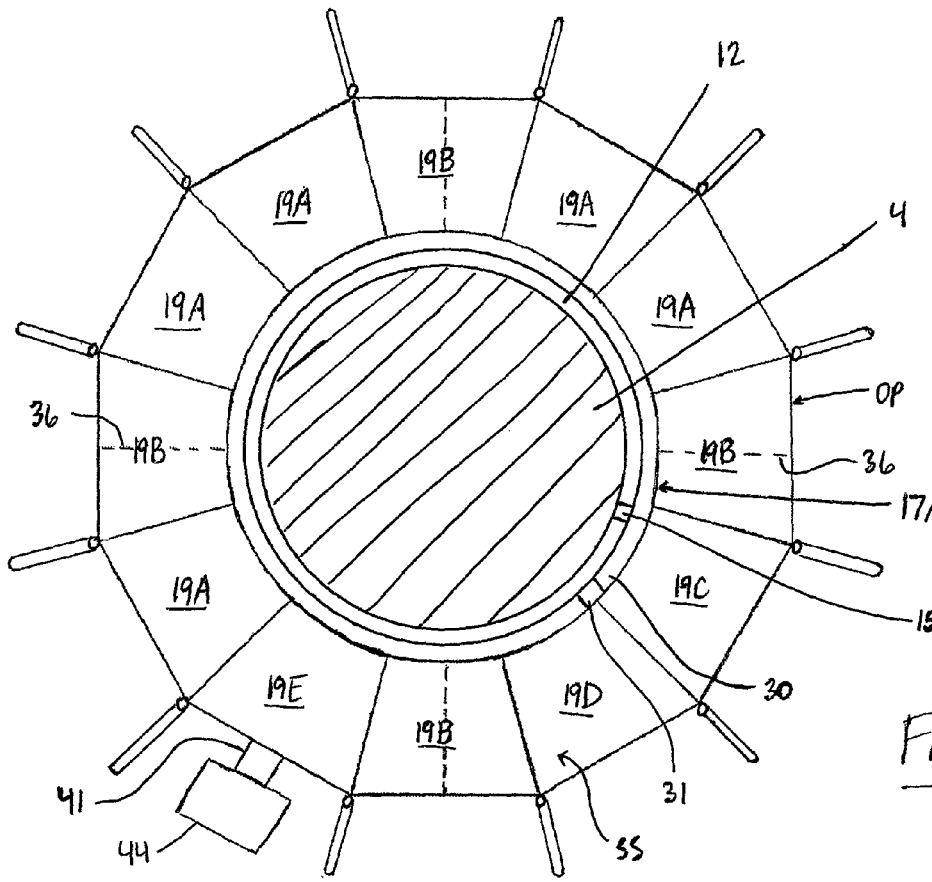
FIG. 3 is a schematic illustration of the tent as if it were shown in cross-section taken along line 3-3 in FIG. 2.
Figure 2:
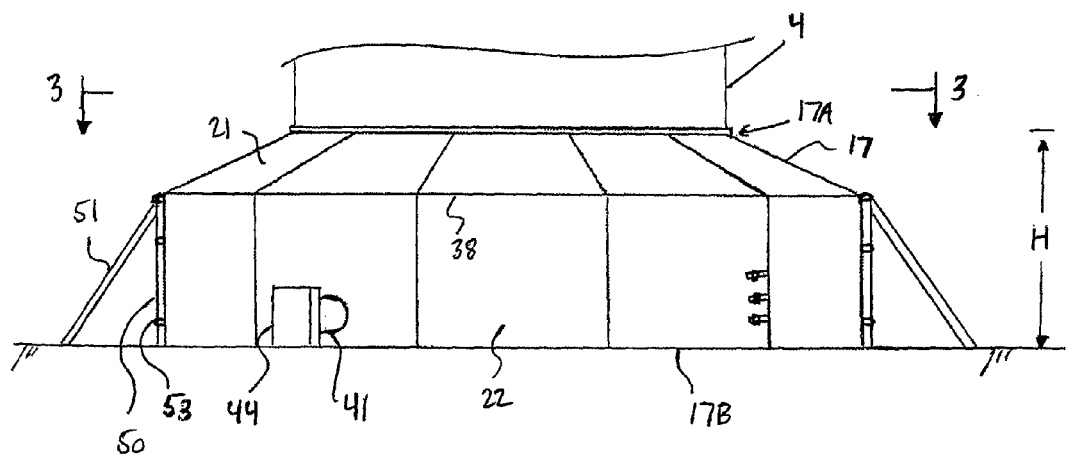
FIG. 2 is an enlarged view showing the tent at the wind turbine tower base in FIG. 1 where some components are omitted for clarity of illustration.

Covering section 19B includes at its top end 24 a pair of apertures 35 reinforced by grommets that are spaced apart in a width direction of the section where pleats schematically indicated at 36 may be formed at spaced locations across the covering 17. Each pleat 36 thus extends from the top edge 17A of the covering towards the bottom edge along at least a portion of the roof section 21. The pleats 36 are located on the covering 17 spaced uniformly each from the next so that when the covering is wrapped about the tower 4 the pleats are arranged at positions uniformly spaced about the perimeter of the structure's base 2. This is illustrated clearly in FIGS. 3 and 4 where two covering sections of a type selected from the group comprising section 19A, 19C, 19D, or 19E are arranged in between every proximal pair of sections 19B, so that when in the installed condition a pair of the sections 19B are located at diametrically opposite locations of the tower base, as shown most clearly in FIG. 3.

At the pleats 36 the tightening strap 29 is passed through the apertures 35 so that a triangular-shaped portion of the roof portion 21, delimited by the apertures 35 defining a base of this triangle and an imaginary point 36A therebetween that is located on a fold line 38 of the respective section generally indicating where the roof portion 21 and wall portion 22 of that section meet, may be folded along a height of the triangle (from base to tip defined by the imaginary point) so as to bring outer edges 36B, 36C spanning between the imaginary point and each one of the apertures 35 to touch.

As such, with the pleats 36 a single size covering may be manufactured to fit a range of sizes of structure perimeter with the pleats being formed to adjust the length of the top edge to match a selected perimeter within the range.

Covering section 19A is substantially identical to covering section 19B with the exception that section 19A is not configured to form a pleat and thus the pocket 28 extends across the full width of the section at the top end 24.

Turning now to covering section 19E, this section includes an opening 40 in the wall portion 22 thereof with a canvas material conduit 41 at the opening 40 extending from the wall portion so as to be arranged externally of the sheltered space in the installed condition. The conduit 41 is sewn to the wall portion 22. At an end of the conduit distal to the wall portion of section 19E there may be provided a heater, such as that manufactured by Herman Nelson Heaters, that is schematically shown at 44 for generating a heated air flow guided by the conduit 41 into the sheltered space for heating same. Alternatively, the heater may be substituted for an air conditioner to generate a cool air flow for cooling the sheltered space. Thus, generally speaking, the conduit 41 guides conditioned air generated by a conditioning source through the opening 40 into or out of the sheltered space SS.

At opposite sides of the covering, as most clearly shown in FIG. 4, there is provided covering sections 19C and 19D which are arranged for joining together in a manner forming an entry to the sheltered space SS. Section 19D includes flaps 46 at each of the roof portion and wall portion of this section that are arranged to overlap the other side of the covering at section 19C to seal the entry to the sheltered space when it is closed. Section 19C supports a series of belts 47 extending in a direction from the side of the wall portion of this section so as to be securable at cooperating buckles carried at section 19D, to hold the entry closed.

Support poles 50 and rods 51 with adjustable length are provided to form a skeletal frame for supporting the covering. The sections 19A-19E at their seams include loops 53 so that the poles can be arranged in an upstanding condition and the covering 17 connected to same at the loops. In the illustrated arrangement, the frame is arranged externally of the sheltered space. The frame is formed by the poles 50 spaced angularly of one another relative to the tower at locations corresponding to the seams at adjacent wall portions 22. The poles are braced in their upstanding condition by the adjustable length rods 51 which are oriented in an inclined position spanning from the poles 50 to the support surface. The rods 51 for example comprise a plurality of tubes arranged in telescopic configuration to provide adjustability of the length of the respective rod. This system of poles and rods 50, 51 thus act to stretch the covering 17 in a manner maintaining the sheltered space.

Tent pegs (not shown) which in the illustrated arrangement are distinct and separate from the poles 50 may be provided to help anchor the covering 17 to the ground. These pegs can be passed through loops adjacent the bottom edge 17B of the covering which may be the same or different than lower ones of the loops like that which is indicated at 53. In some arrangements the upstanding poles 50 may be driven into the ground at pointed bottom ends of the poles for anchoring the covering to the ground.

In use, a setup of the tent 10 includes attaching the base strap 12 to the structure 1 at the predetermined height H with an inner face 12A of the base strap, where there is no Velcro material, facing towards the structure 1 so that the base strap forms a closed loop about the structure. The free terminus of the base strap, that is the end without the ratchet 15, is passed through the ratchet 15 of the base strap to close the loop and arrange the strap 12 tightly wrapped about the base 2 of the tower 4.

The top edge 17A of the covering 17 by the second attachment member 32, that is by its Velcro material, is attached to the base strap 12 at its first attachment member 14 so as to wrap the top edge 17A following the perimeter of the base of the structure thereby locating the top edge 17A at the structure. In the illustrated arrangement, each top end 24 of the respective section 19A-19E is arranged each to the next so as to form the top edge 17A contiguously at the base strap. This step comprises wrapping the plurality of sections 19A-19E which unitarily form the covering 17 about the base of the structure as the sections are joined together in the prefabricated fashion described earlier.

The tightening strap 29 passing through the pockets 28 of all of the sections is then formed into its closed loop and by the ratchet the circumference of the closed loop is adjusted to sandwich the cooperating Velcro fasteners 14, 32 together between the fabric of the base strap 12 and the tightening strap. Thus the fabric strip of the base strap with its inner face at the structure base, the Velcro material 14 lining the outer face 12B of the base strap, the Velcro material 32 at the inner face of the covering top edge 17A, and the tightening strap 29 form a series of concentric polygons, in this case circles, each following the perimeter of the structure base 2. The tightening strap 29 acts to uniformly press the Velcro material 32 of the covering against the Velcro material 14 of the base strap along the full circumference of the base strap so as to seal the connection thereat in a manner inhibiting passage of foreign materials and moisture from outside the sheltered space.

The adjacent roof portions 21 are coupled together.

The bottom edge 17B of the covering is arranged at a location spaced outwardly from the structure, that is radially outwardly from its top edge 17A, so as to define an outer periphery OP of the covering and of the sheltered space. The sheltered space which is enclosed in the illustrated arrangement is thus delimited at the outer periphery OP by the wall portions 22 of the covering 17 with the bottom edge 17B at the ground and the roof portions 21 spanning from an upstanding wall formed by the wall portions 22 to a face 4A of the tower 4 where the base strap 12 is located at the predetermined height H.

The support poles and rods 50, 51 are set up, the poles 50 in upstanding condition through the loop 53 at the seams of adjacent wall portions and the rods 51 bracing the poles, so as to maintain the covering 17 in the installed condition.

In an alternative arrangement, each pair of adjacent sections are joined together at their sides along both the wall portion and the roof portion. Thus, the covering defines a continuous and uninterrupted top edge, and a continuous and uninterrupted pocket is formed along the top edge through which the tightening strap with ratchet is passed.

Also, in an alternative arrangement the covering may be stretched by locating the bottom edge 17B sufficiently far from the tower so that the material of the covering is in tension in a manner supporting itself thereby forgoing at least some of the poles and rods, if not all, to maintain the covering in the installed condition.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A tent for surrounding a base of an upstanding structure in fixed location on a support surface, the base having a perimeter, comprising:
   a covering having a top edge arranged to follow the perimeter of the structure base at a predetermined height above the support surface and a bottom edge arranged to define an outer periphery of the covering in an installed condition surrounding the structure base;
   an attachment arrangement for attaching the covering to the structure at its base including a base strap arranged for wrapping about the perimeter of the structure base at the predetermined height above the support surface;
   the base strap having an outer face with a first attachment member;
   the attachment arrangement including a second attachment member along the top edge of the covering that is cooperative with the first attachment member so as to fasten the top edge to the base strap in a manner following the perimeter of the structure base;
   the covering being arranged in the installed condition for forming a sheltered space around the base of the structure between the top edge of the covering which is attached to the base strap around the perimeter of the base and the outer periphery of the covering.

2. The tent according to claim 1 wherein the covering is formed in a plurality of sections each arranged to span a portion of the perimeter of the structure base and each comprising a roof portion forming at one end thereof a portion of the top edge of the covering and a wall portion forming at one end thereof which is distal to the roof portion a portion of the bottom edge of the covering, wherein the sections are connected together at their sides in a prefabricated fashion so that the covering is arranged for wrapping about the base structure.

3. The tent according to claim 2 wherein the sections are connected together at their wall portions in the prefabricated fashion so that the roof portions of each pair of adjacent sections are connectable during installation at a seam formed therebetween.

4. The tent according to claim 2 wherein the sides of each section at the wall portion are parallel to one another and the roof portion is tapered from its bottom proximal the wall portion to said end forming the portion of the top edge.

5. The tent according to claim 4 wherein the wall portion is generally rectangular in shape and the roof portion is generally trapezoidal in shape.

6. The tent according to claim 1 wherein the base strap is arranged to form a closed loop having an adjustable circumference such that the base strap is arranged for tightening about the base structure once wrapped thereabout.

7. The tent according to claim 1 wherein there is provided along the top edge of the covering a tightening strap behind the second attachment member such that the second attachment member is disposed intermediate the tightening strap and the base strap in the installed condition with the tightening strap being arranged to form a closed loop following the base strap to seal connection of the first and second attachment members in the installed condition.

8. The tent according to claim 1 wherein the covering comprises a body of material extending from the top edge of the covering towards the bottom edge that is translucent so as to allow passage of light externally of the sheltered space through the body of material.

9. The tent according to claim 1 wherein there is provided at least one opening in the covering with a conduit extending therefrom for guiding conditioned air generated by a conditioning source through said opening into or out of the sheltered space of the installed condition.

10. The tent according to claim 1 wherein the covering has opposite sides arranged for removably joining together in a manner forming an entry to the sheltered space with one of the sides including flaps for overlapping the other side of the covering to seal the entry when it is closed.

11. The tent according to claim 1 wherein the covering includes pleats each extending from the top edge towards the bottom edge where the pleats are arranged at locations spaced uniformly each from the next so as to be arranged in the installed condition at positions uniformly spaced about the perimeter of the structure.

12. The tent according to claim 1 in combination with the upstanding structure wherein the covering is in the installed condition and the bottom edge of the covering is arranged at the support surface such that the sheltered space around the structure base is enclosed from the predetermined height at the base to the support surface.

13. A method for arranging a sheltered space around a base of an upstanding structure in fixed location on a support surface, the base having a perimeter, comprising:
   providing a tent for forming the sheltered space comprising:
      a covering having a top edge arranged to follow the perimeter of the structure base at a predetermined height above the support surface and a bottom edge arranged to define an outer periphery of the covering in an installed condition surrounding the structure base;
      an attachment arrangement for attaching the covering to the structure at its base including a base strap arranged for wrapping about the perimeter of the structure base at the predetermined height above the support surface;
      the base strap having an outer face with a first attachment member;

the attachment arrangement including a second attachment member along the top edge of the covering that is cooperative with the first attachment member so as to fasten the top edge to the base strap in a manner following the perimeter of the structure base;

attaching the base strap to the structure at the predetermined height with an inner face of the base strap facing towards the structure so that the base strap forms a closed loop about the structure;

attaching the top edge of the covering by the second attachment member to the base strap at its first attachment member so as to wrap the top edge about the perimeter of the base of the structure thereby locating said top edge at the structure;

arranging the bottom edge of the covering at a location spaced outwardly from the structure so as to define the outer periphery of the covering;

whereby the sheltered space is formed around the base between the top edge of the covering which is attached to the base strap around the perimeter of the base and the outer periphery of the covering.

14. The method according to claim 13 wherein the covering is formed in a plurality of sections each arranged to span a portion of the perimeter of the structure base and each comprising a roof portion forming at one end thereof a portion of the top edge of the covering and a wall portion forming at one end thereof which is distal to the roof portion a portion of the bottom edge of the covering, wherein the sections are connected together at their sides in a prefabricated fashion so that the covering is arranged for wrapping about the base structure, and wherein the step of attaching the top edge of the covering to the base strap includes wrapping the plurality of sections unitarily forming the covering about the base of the structure.

15. The method according to claim 13 wherein there is provided a tightening strap along the top edge of the covering at a position outwardly of the second attachment member that is arranged to form a closed loop following the base strap, and, with the top edge of the covering attached to the base strap, there is provided a step of pressing the top edge in its attached state to the base strap by adjusting a circumference of the closed loop of the tightening strap so as to seal a junction of the covering at its top edge and the base strap.

16. The method according to claim 13 wherein the base strap is arranged to have an adjustable circumference when formed in the loop, and the step of attaching the base strap to the base of the structure includes adjusting said circumference of the loop to tighten the base strap around the perimeter of the structure.

17. The method according to claim 13 comprising a step of providing the upstanding structure, and wherein the structure is an electric wind turbine such that the sheltered space is formed about a base of a tower of the turbine.

18. The method according to claim 13 wherein the bottom edge of the covering is arranged at the support surface such that the sheltered space around the structure base is enclosed from the predetermined height at the base to the support surface.

* * * * *